United States Patent
Larson

[11] 4,023,405
[45] May 17, 1977

[54] TUNED QUICK CONNECT AND DISCONNECT COUPLING ARRANGEMENT

[75] Inventor: Larry Allen Larson, Peoria, Ill.

[73] Assignee: Caterpillar Tractor Co., Peoria, Ill.

[22] Filed: May 17, 1976

[21] Appl. No.: 687,121

[52] U.S. Cl. .............................. 73/134; 64/27 NM
[51] Int. Cl.² ......................................... G01L 3/16
[58] Field of Search ................ 73/133 R, 134, 135; 64/27 NM

[56] References Cited
UNITED STATES PATENTS

| | | | |
|---|---|---|---|
| 1,820,750 | 8/1931 | Lord | 64/27 NM X |
| 2,296,955 | 9/1942 | Sherwell et al. | 64/27 NM X |
| 2,362,682 | 11/1944 | Watson | 73/134 |
| 2,374,207 | 4/1945 | Jackson | 73/134 |

Primary Examiner—Charles A. Ruehl
Attorney, Agent, or Firm—John W. Grant

[57] ABSTRACT

A tuned quick connect and disconnect coupling arrangement includes a tubular adapter removably secured to the output shaft of an engine and has an external spline formed on its periphery. A tuned resilient coupling assembly is secured to the dynamometer input shaft and has an internal spline adapted for meshing engagement with the external spline of the adapter for drivingly coupling the shaft to one another for checking the power output of the engine and is disengageable therefrom for uncoupling the shafts from each other. The coupling assembly includes an annular ring containing the internal spline, an elongate torque tube having a pair of radially outwardly extending flanges secured thereto at its opposite ends with one of the flanges resiliently connected to the annular ring, and a hub having a radially outwardly extending flange formed thereon resiliently connected to the other flange of the torque tube. The hub is secured to the dynamometer input shaft for imparting rotation thereto through a diametral tapered bore formed in the hub, a device operatively associated with the dynamometer input shaft and which provides a complementary external tapered surface, and a device operatively connected to the hub to axially draw the external tapered surface into wedging gripping relation with the tapered bore to drivingly interlock the hub to the input shaft.

8 Claims, 7 Drawing Figures

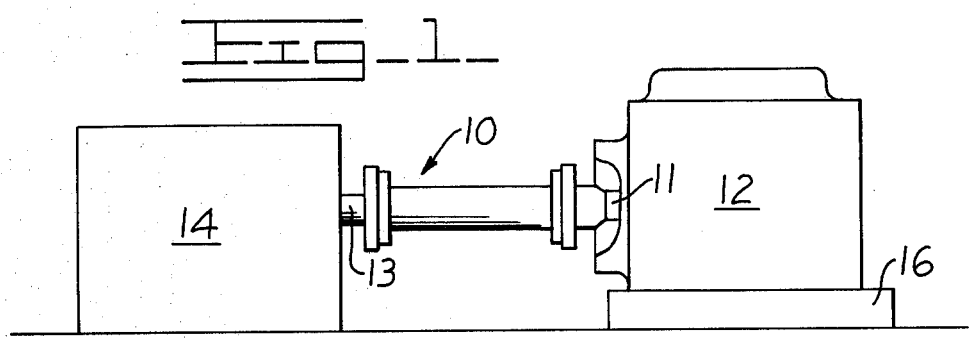
Fig_1_
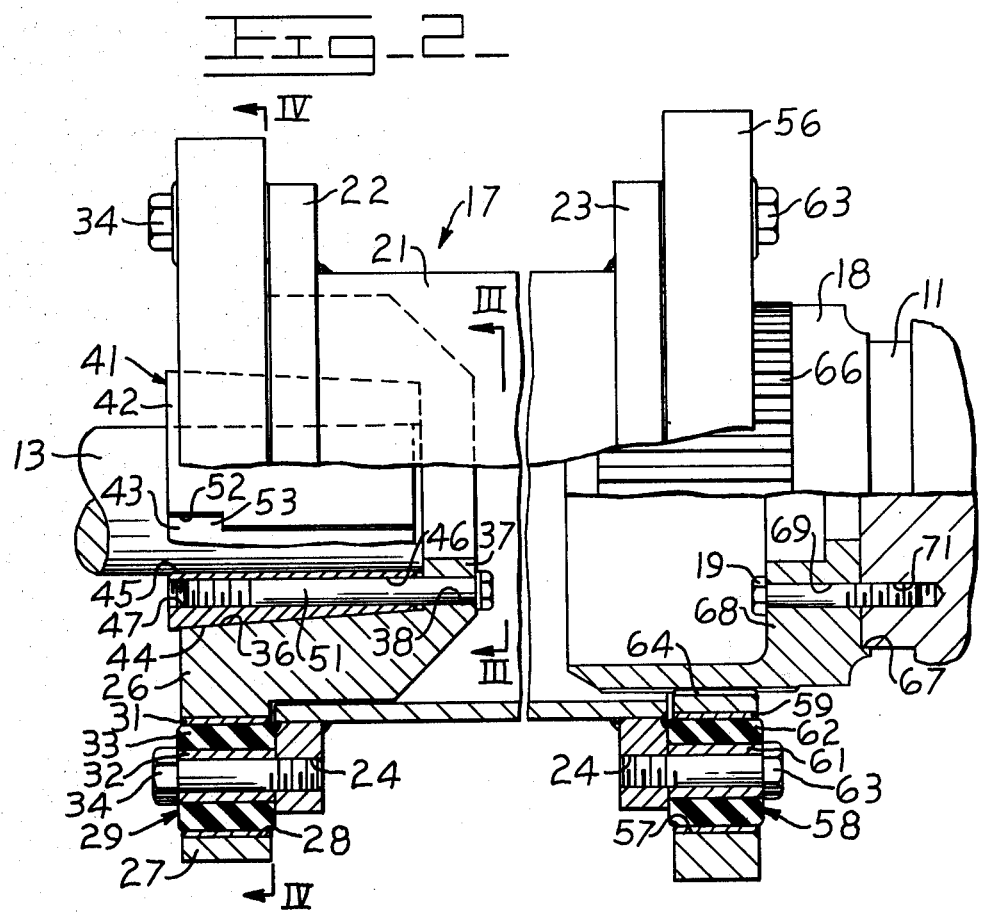
Fig_2_
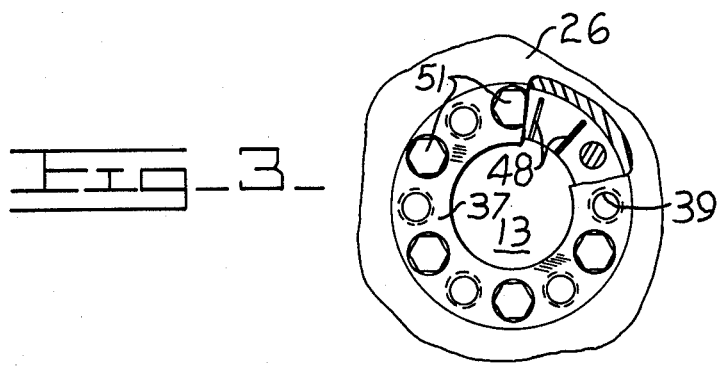
Fig_3_

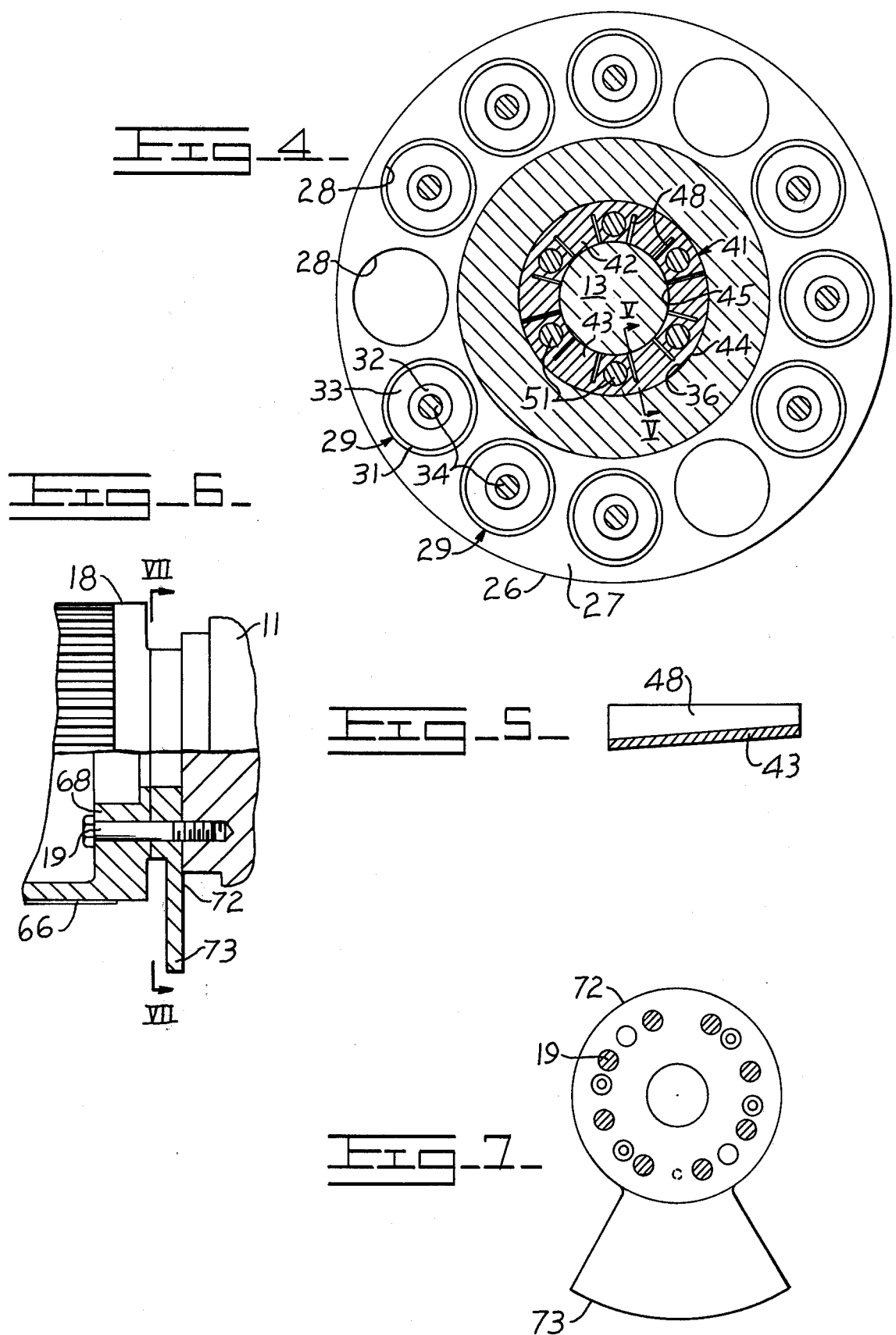

TUNED QUICK CONNECT AND DISCONNECT COUPLING ARRANGEMENT

BACKGROUND OF THE INVENTION

It is common practice for the manufacturer of internal combustion engines to connect each of the assembled engines to a dynamometer through a connecting coupling for various types of testing prior to installing them in vehicles, or preparing them for industrial applications, or shipping them to customers. Such manufacturers occasionally assemble a family of related engine models having different horse power ratings and/or operating characteristics on the same assembly line. As is normally the case, the demand for a particular model fluctuates so that frequently there are more of one or two engine models being assembled than other engine models. When this happens and if the dynamometers and connecting couplings are set up such that they will accept only one engine model, some dynamometers would go unused for lack of particular model builds while stack-up awaiting test would occur at other dynamometers. The problem of having to couple a particular engine model to a particular dynamometer is compounded when, depending on its use, the same engine model may be tested without a flywheel or it may be tested with one of several flywheel designs mounted on the crankshaft. To stock a complete coupling for every engine variation at every dynamometer is not economically practical.

A basic design problem encountered in the design of a coupling for connecting an engine to a dynamometer is that of avoiding damaging resonant loads. For example, the resonant torque values are frequently approximately 8 times the normal engine lug torque and many of the presently available couplings have a resonant life of only 5 minutes. The resonant loads also create problems in the mechanical connection between the coupling and the dynamometer shaft. An experimental coupling which is utilized in the manufacturing facility of the Assignee of the present invention and which led to the coupling design of the present invention employed a conventional key and key-way drive connection between the coupling and the dynamometer shaft. However, the resonant torque loads passing through the key and key-way caused deterioration thereof and led to replacement of the key and repairs to the shaft and mating elements of the coupling.

OBJECTS OF THE INVENTION

Accordingly, an object of this invention is to provide an improved tuned quick connect and disconnect coupling arrangement which provides a universal coupling arrangement to permit any of several internal combustion engine models to be quickly coupled to any of several dynamometers.

Another object of this invention is to provide such an improved coupling arrangement which provides the capability of being tuned to place the resonant loads reasonably expected to be imposed thereon at an operating speed seldom used when the engine is coupled to the dynamometer.

Another object of this invention is to provide a coupling arrangement of the character described which is readily separatable with the bulk of the coupling being secured to the dynamometer shaft and adapted to meshingly receive any one of several relatively lightweight engine end adapters which are preconnected to the engine so that as soon as one engine is uncoupled from the dynamometer another engine may be coupled thereto with a minimum of time lapse.

Another object of this invention is to provide an improved coupling arrangement which provides a semi-permanent connection between one end of the coupling and the dynamometer shaft capable of withstanding relatively high resonant loads for extended periods without incurring structural damage thereto.

Other objects and advantages of the present invention will become more readily apparent upon reference to the accompany drawings and following description.

BRIEF DESCRIPTION OF THE DRAWINGS

FIG. 1 is a side elevational schematic illustration of a tuned quick connect and disconnect coupling arrangement embodying the principles of the present invention operatively connecting an engine to a dynamometer.

FIG. 2 is an enlarged elevational view of the coupling arrangement with portions shown in section for illustrative convenience.

FIG. 3 is an elevational view of a portion of the coupling arrangement as viewed along line III—III in FIG. 2.

FIG. 4 is a vertical sectional view taken along line IV—IV of FIG. 2.

FIG. 5 is a sectional view taken along lines V—V of FIG. 4.

FIG. 6 is an alternate embodiment of the connection between the coupling arrangement and the engine.

FIG. 7 is a sectional view taken along line VII—VII of FIG. 6.

DESCRIPTION OF THE PREFERRED EMBODIMENTS

Referring now to the drawings, a tuned quick connect and disconnect coupling arrangement embodying the principles of the present invention is generally indicated by the reference numeral 10 for coupling a crankshaft 11 of an internal combustion engine schematically illustrated at 12 to an input shaft 13 of a dynamometer schematically illustrated at 14. The engine is mounted on a moveable pallet indicated at 16 during the coupling and uncoupling operation hereinafter described in greater detail.

As more clearly shown in FIG. 2, the coupling arrangement includes a tuned resilient coupling assembly 17 attached to the dynamometer input shaft 13 and an adapter 18 removably secured to the crankshaft 11 by a plurality of bolts one shown at 19. In the coupled condition shown, the shafts are in substantial axial alignment and the shafts and coupling arrangement are rotatable about a common longitudinal axis. The coupling assembly includes an elongate torque tube 21 having a pair of radially outwardly extending flanges 22 and 23 rigidly secured to its opposite ends as by welding or the like. Each of the flanges has a pattern of twelve equally spaced longitudinally extending threaded holes, one shown at 24 in each of the flanges, extending therethrough. The pattern of the threaded holes is identical to that shown in FIG. 4.

A hub 26 has a radially outwardly extending flange 27 disposed adjacent to the flange 22 of the torque tube 21. As more clearly shown in FIG. 4, the flange has 12 equally spaced longitudinally extending holes 28 extending therethrough with each hole being in axial alignment with one of the threaded holes 24 in the flange 22. A resilient bushing 29 is disposed in each of nine of the holes 28 and are arranged in a pattern as shown in FIG. 4 so as not to create an unbalanced condition of the hub. Each of the resilient bushings includes a rigid outer sleeve 31, a rigid inner sleeve 32 and an intermediate member 33 disposed between and bonded to the sleeves, the intermediate member being formed from a rubber material or the like. A bolt 34 extends through each of the inner sleeves of the resilient bushings and is screw threaded into the axial aligned threaded hole in the flange 22 for resiliently securing the flange of the torque tube to the flange of the hub.

The hub 26 has a centrally disposed longitudinally extending tapered bore 36 formed therein in circumscribing relation to the dynamometer input shaft 13 and has an open end adjacent to the dynamometer. A radially inwardly extending flange 37 is disposed at the smaller end of the tapered bore. A plurality of equally spaced holes 38 and a plurality of threaded holes 39 extend through the flange 37 with each of the threaded holes disposed between a pair of adjacent holes.

A bushing 41 is formed by a pair of substantially symetrical halves 42 and 43 and is disposed within the tapered bore 36 of the hub 26. A tapered external surface 44 is formed on the bushing with the tapered surface being complementary to the tapered bore. A longitudinally extending bore 45 is formed by the bushing halves and wedgingly embraces the dynamometer shaft. Each of the bushing halves includes a plurality of longitudinally extending holes 46 extending therethrough with each hole being in axial alignment with one of the holes 38 in the flange 37 and have a threaded portion 47 provided therein. A plurality of longitudinally extending circumferentially spaced grooves 48 are formed in the bore of the bushing with the bottom surface of each groove being substantially parallel to the external surface of the bushing. A plurality of bolts 51 individually extend through the holes 38 in the flange 37 and are screw threaded to the threaded portion 47 of the holes 46 to axially draw the halves of the bushing toward the inwardly extending flange. This causes the external surface to be forced into wedging gripping relation with the tapered bore while at the same time causing the bushings to shrink and tightly grip the dynamometer shaft. As more clearly shown in FIG. 2, a notch 52 and a complementary projection 53 are individually formed on the adjacent edges of the bushing halves so that axial movement of the bushing half 43 towards the inwardly extending flange also causes the bushing half 42 to move toward the inwardly extending flange. A similar notch and projection arrangement is formed on the opposite edges, not shown, to insure unitary movement of the halves when the bushing half 42 is drawn toward the inwardly extending flange.

An annular ring 56 is disposed adjacent to the flange 23 and has twelve longitudinally extending holes, one shown at 57, extending therethrough with the holes being in axial alignment with the threaded holes 24 in the flange 23. The hole pattern is identical to that provided in the outwardly extending flange 27 of the hub 26 as shown in FIG. 4. A resilient bushing 58 is disposed in each of nine of the holes with the bushings arranged in a pattern so that the bushings do not create an unbalanced condition of the annular ring. The particular pattern is identical to that illustrated in FIG. 4. Each of the resilient bushings includes an outer rigid sleeve 59 seated in the respective hole, an inner rigid sleeve 61 and an intermediate member 62 sandwiched between and bonded to the sleeves, the resilient member being constructed of a rubber or the like. A bolt 63 extends through the inner sleeve of each resilient bushing and is screw threaded into the axially aligned threaded hole in the flange 23 for resiliently securing the annular ring to the flange. An internal spline 64 is formed in a centrally disposed bore of the annular ring.

Although the hole pattern and the pattern of bushings 58 is described as being identical, this feature is not critical and the sizes of the flange 23 and annular ring 56 may be tailored to fit a particular requirement as long as both the flange and ring each have 12 equally spaced holes provided therein with the holes in the flange disposed in axially alignment with the holes in the ring.

The adapter 18 has a substantially cylindrical shape and has an external spline 66 formed on its periphery and is shown in meshing engagement with the internal spline 64 of the coupling assembly 17. A pilot recess 67 is formed on an end wall 68 of the adapter to receive the crankshaft 11 for accurate coaxial positioning of the adapter. A plurality of equally spaced holes, one shown at 69, extend through the end of the adapter, each hole being in axial alignment with a threaded hole 71 in the crankshaft. The bolts 19 extend through the hole in the end and are threaded into the threaded holes for securing the adapter to the crankshaft.

FIGS. 6 and 7 disclose an alternate embodiment for connecting the adapter 18 to the crankshaft 11 and includes sandwiching a bobweight 72 between the end 68 of the adapter and the crankshaft. An eccentric portion 73 is formed on the bobweight which functions to provide a balancing effect to the engine. The bobweight is employed only in the testing of certain engine models which have compensating balance built into the flywheel and may be selectively utilized in place of the flywheel when it is desirable to test the engine without the flywheel mounted to the crankshaft.

OPERATION

While the operation of the present invention is believed clearly apparent from the foregoing description, further amplification will subsequently be made in the following brief summary of such operation. The bulk of the coupling arrangement 10 is contained in the coupling assembly 17 which is secured to the dynamometer input shaft 13 through the wedging action provided by the split bushing 41 and the tapered bore 36 of the hub 26. After the coupling assembly has been positioned on the dynamometer input shaft such that the shaft extends into the bore 45 of the bushing, the bolts 51 are inserted into the holes 38 in the inwardly extending flange 37 and are screw threaded into the threaded portion 47 of the holes 46 formed in the bushing halves 42 and 43. Tightening the bolts draws the bushing toward the smaller end of the tapered bore and the flange 37 so that the external tapered surface 44 is drawn into the tapered bore creating a wedging gripping connection therebetween. Also, the reaction of the external tapered surface and the tapered bore causes the bushing to shrink and tightly grip the dynamometer input shaft thereby creating a driving connection between the hub 26 and the shaft. The longitudinal grooves 48 allow the arc segment portions of the bushing between the grooves to increasingly penetrate the shaft surface at extreme torque transfers to enhance the torque capacity of the basic friction drive provided by the bushing-shaft combination. The hub may be attached to the dynamometer input shaft prior to securing the torque tube 21 to the radially outwardly extending flange 27 of the hub.

Once the hub 26 is attached to the dynamometer input shaft 13, it normally remains mounted thereto indefinitely. However, if it becomes necessary to remove the coupling assembly from the dynamometer input shaft, the bolts 51 are removed from the threaded portion 47 of the holes 46 and the holes 38 in the flange 37 and threaded into the adjacent threaded holes 39 in the inwardly extending flange. The ends of the bolts engage the end of the bushing 41 causing it to separate from the inwardly extending flange thereby breaking the connection between the hub, bushing and shaft.

The spring rate of the coupling assembly 17 is determined by the number of resilient bushings 29 and 58 inserted into the holes 28 and 57 of the outwardly extending flange 27 and annular ring 56. The number of resilient bushings associated with the outwardly extending flange is equal to the number of bushings associated with the annular ring. The twelve mounting holes formed in both the outwardly extending flange and the annular ring provide a maximum variation of spring rate so that the coupling can be tuned to be free of resonance in the speed ranges used for engine tests. For example, with twelve holes either 2, 3, 4, 6, 8, 9, 10 or 12 resilient bushings may be utilized while maintaining the coupling assembly in centrifugally balanced condition. In the present case, a total of 9 resilient bushings are employed to tune the coupling assembly for a particular family of engines and places the resonant frequency in transient speed ranges where the time spent at the high torsional loads of resonance will be minimal.

The adapter 18 is relatively lightweight when compared with the weight of the coupling assembly 17 and can be easily attached to the crankshaft 11 of the engine 12 by a mechanic without the aid of a hoist. After the adapter is secured to the crankshaft, the pallet 16 carrying the engine is positioned such that the crankshaft is in substantial axial alignment with the dynamometer input shaft 13 and the pallet then moved toward the dynamometer so that the external spline 66 of the adapter meshingly engages with the internal spline 64 of the coupling assembly. This effectively couples the crankshaft of the engine to the dynamometer input shaft. After the tests on the engine have been performed, the pallet is moved in a direction away from the dynamometer thereby separating the spline connection. Suitable guide means, not shown, are normally utilized to accurately align the pallet relative to the dynamometer during the coupling procedure. However, the resilient bushings permit the coupling arrangement to tolerate slight misalignment between the crankshaft and the dynamometer input shaft.

In some cases, an engine with compensating balance built into the flywheel is to be tested without that flywheel. In such cases, the bobweight 72 is secured to the crankshaft 11 between the adapter and the crankshaft as a substitute for the flywheel to balance the engine during testing.

In view of the foregoing, it is readily apparent that the structure of the present invention provides an improved tuned quick connect and disconnect coupling arrangement which permits a single dynamometer to be readily coupled to any of several engine models or variations of the engine models. This is accomplished by incorporating the bulk of the coupling arrangement within the coupling assembly which is secured to the dynamometer shaft while the adapter which is removably secured to the crankshaft of the engine is relatively lightweight and is easily handled by a mechanic. The coupling assembly is provided with an internal spline which meshingly receives an external spline of the adapter as the connecting joint between the adapter and the accompanying assembly. Thus, to utilize the same dynamometer for a number of engine models, it is only necessary to provide the adapter for each engine crankshaft configuration with an external spline being of the size to mate with the internal spline of the coupling assembly. Furthermore, by utilizing identical coupling assemblies on each of several dynamometers, each of the dynamometers could then be utilized to test any one of the various engine models. The connection between the coupling assembly and the dynamometer shaft is provided by the split bushing having an external tapered surface complementary to a tapered bore in the hub. The wedging action shrinks the bushing which tightly grips the dynamometer shaft, eliminating the possibility of backlash between the dynamometer input shaft and the coupling.

While the invention has been described and shown with particular reference to the preferred embodiment, it will be apparent that variations might be possible that would fall within the scope of the present invention which is not intended to be limited except as defined in the following claims.

What is claimed is:

1. A tuned quick connect and disconnect coupling arrangement adapted to drivingly couple an output shaft of an internal combustion engine to a substantially axially aligned input shaft of a dynamometer for checking the power output of the engine and adapted for rapidly connecting the output shaft to and disconnecting the output shaft from the dynamometer input shaft, the coupling arrangement comprising:

a tubular adapter having an external spline formed on its periphery, and a radially inwardly extending flange disposed at one end thereof adapted to be removably secured to the output shaft of the engine, and a tuned resilient coupling assembly secured to the dynamometer input shaft and having an internal spline adapted for meshing engagement with the external spline of the adapter for drivingly coupling the shafts to one another for unitary rotation about a common longitudinal axis and is disengageable therefrom for uncoupling the shafts from each other, the coupling assembly including:

an annular ring containing the internal spline;

an elongate torque tube having a pair of radially outwardly extending flanges secured thereto at its opposite ends;

first means resiliently connecting the annular ring to one of the flanges of the torque tube;

a hub having a radially outwardly extending flange formed thereon;

second means resiliently connecting the outwardly extending flange of the hub to the other flange of the torque tube; and means for securing the hub to the dynamometer input shaft for imparting rotation thereto including a diametral tapered bore formed in the hub, means operatively associated with the dynamometer input shaft for providing an external tapered surface complementary to the tapered bore, and means operatively connected to the hub to axially draw the external tapered surface into wedging gripping relation with the tapered bore to drivingly interlock the hub to the dynamometer input shaft.

2. The coupling arrangement of claim 1 wherein the means providing a complementary external tapered surface on the dynamometer input shaft includes split bushing means disposed within the tapered bore and having an external tapered surface formed thereon and a bore extending therethrough, the bushing means being seated on the dynamometer input shaft so that when the external tapered surface is drawn into the tapered bore, the bushing means shrinks and clampingly drivingly grips the dynamometer input shaft.

3. The coupling arrangement of claim 2 wherein the means to axially draw the external surface into wedging gripping relation with the tapered bore includes a radially inwardly extending flange formed on the hub and axially spaced from the end of the bushing means, means forming a plurality of equally spaced holes extending through the flange, means forming an equal number of threaded holes in the bushing individually axially aligned with the holes in the flange, and a plurality of bolts individually received in the holes of the flange and screw threaded into the threaded holes of the bushing means to draw the bushing means toward the radially inwardly extending flange.

4. The coupling arrangement of claim 3 wherein the split bushing means has a plurality of longitudinally extending grooves formed in the bore to provide limited circumferential flexing of the bushing means, said bushing means being formed by a pair of substantially symetrical halves.

5. The coupling arrangement of claim 4 wherein the first resilient means includes a pattern of twelve equally spaced holes extending through the annular ring, a matching number of threaded holes formed in the one flange of the torque tube and individually axially aligned with the holes in the annular ring, a preselected number of resilient bushings individually disposed in some of the holes in the annular ring with the holes which receive the resilient bushings being selected to maintain the annular ring in a balanced condition, and a plurality of bolts individually extending through a central bore in the resilient bushings and screw threaded into the threaded holes formed in the flange.

6. The coupling arrangement of claim 5 wherein the second resilient means includes a pattern of twelve equally spaced holes extending through the radially outwardly extending flange of the hub, a matching number of threaded holes formed in the other flange of the torque tube and individually axially aligned with the holes in the outwardly extending flange, a number of resilient bushings individually disposed in some of the holes with the holes which receive the resilient bushings being selected to maintain the hub in a balanced condition and the number of resilient bushings being equal to the number of resilient bushings provided in the annular ring, and a plurality of bolts individually extending through a central bore in the resilient bushings and screw threaded into the threaded holes provided in the other flange.

7. The coupling arrangement of claim 1 including a bobweight adapted to be sandwiched between the tubular adapter and the output shaft of the engine to provide a balancing effect to the engine during certain testing procedures.

8. A tuned quick connect and disconnect coupling arrangement adapted to drivingly couple an output shaft of an internal combustion engine to a substantially axially aligned input shaft of a dynamometer for checking the power output of the engine and adapted for rapidly connecting the output shaft to and disconnecting the output shaft from the dynamometer input shaft, the coupling arrangement comprising:

a tubular adapter having an external spline formed on its periphery and a radially inwardly extending flange disposed at one end thereof adapted to be removably secured to the output shaft of the engine; and a tuned resilient coupling assembly secured to the dynamometer input shaft and having an internal spline adapted for meshing engagement with the external spline of the adapter for drivingly coupling the shafts to one another for unitary rotation about a common longitudinal axis and is disengageable therefrom for uncoupling the shafts from each other, the coupling assembly including:

an elongate torque tube having a pair of radially outwardly extending flanges secured thereto at its opposite ends, each of the flanges having twelve equally spaced threaded holes extending longitudinally therethrough;

an annular ring disposed adjacent one of the flanges of the torque tube and containing the internal spline and having a plurality of holes extending therethrough individually axially aligned with the threaded holes in the one flange of the torque tube;

a plurality of resilient bushings individually disposed in some of the holes in the annular ring, each of the bushings including an outer rigid sleeve, an inner rigid sleeve, and a resilient intermediate member disposed between the inner and outer sleeves;

a plurality of bolts extending through the inner sleeve of the resilient bushings and screw threaded into the threaded holes in the one flange;

a hub having a radially outwardly extending flange formed thereon disposed adjacent to the other flange of the torque tube and having a plurality of holes extending therethrough individually axially aligned with the threaded holes in the other flange;

a plurality of resilient bushings individually disposed in some of the holes in the flange of the hub, each of said bushings including an outer rigid sleeve, an inner rigid sleeve, and a resilient intermediate member disposed between the inner and outer sleeves;

a plurality of bolts extending through the inner sleeve of the resilient bushings and screw threaded into the threaded holes in the other flange; and means for securing the hub to the dynamometer input shaft including means forming a longitudinally extending tapered bore in the hub, a radially inwardly extending flange formed at the smaller end of the tapered bore, means forming a plurality of equally spaced holes in the flange, a split two-piece bushing disposed in the tapered bore and having an external tapered surface formed thereon complimentary to the tapered bore and a plurality of threaded holes provided therein individually axially aligned with the holes in the inwardly extending flange, the split bore forming a central bore therein with the dynamometer input shaft extending therethrough, and a plurality of bolts individually extending through the holes in the inwardly extending flange and screw threaded into the threaded holes in the bushing to axially draw the bushing toward the inwardly extending flange to draw the external tapered surface into wedging gripping relation with the tapered bore causing the bushing to shrink and clampingly grip the dynamometer input shaft.

* * * * *